UNITED STATES PATENT OFFICE.

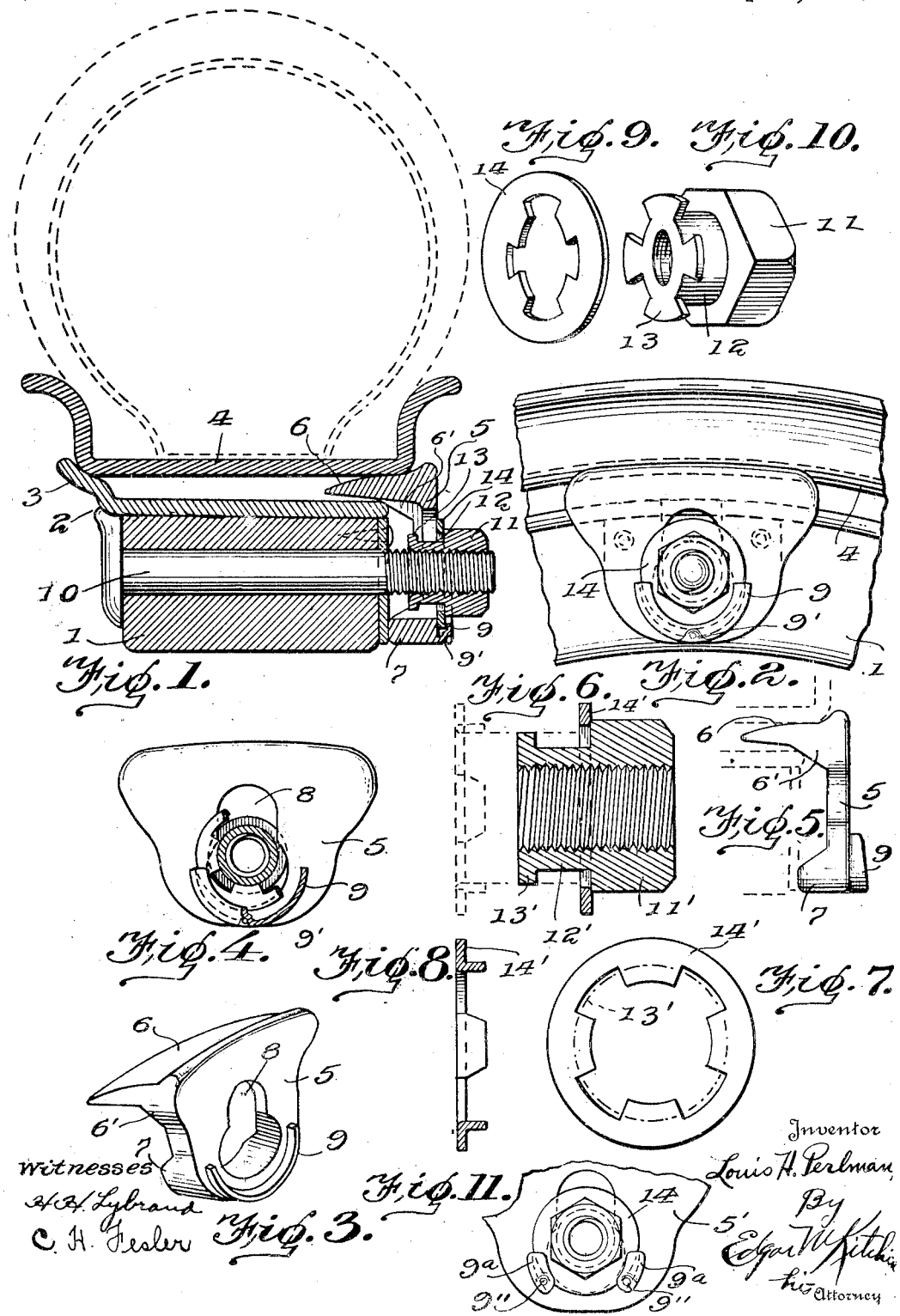

LOUIS H. PERLMAN, OF NEW YORK, N. Y.

WHEEL.

1,374,106.  Specification of Letters Patent.  Patented Apr. 5, 1921.

Application filed August 16, 1917. Serial No. 186,526.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in demountable rim locking means and is directed more particularly to the contour of the locking wedge of a demountable rim and to the swivel connection of the nut to the locking wedge.

The principal objects in view are the production of an effective locking wedge adapted to enter with facility the space between a demountable rim and its fixed rim and to provide for the ready withdrawal of such wedge.

With these and further objects in view as will in part hereinafter become apparent and in part be stated, the invention comprises certain novel constructions, combinations and arrangements of parts as subsequently specified and claimed.

In the accompanying drawing:—

Figure 1 is a transverse vertical section through the peripheral portion of a wheel embodying the features of the present invention.

Fig. 2 is a view in side elevation thereof.

Fig. 3 is a perspective view of the wedge plate detached.

Fig. 4 is a view in side elevation of the wedge plate with the nut and washer shown in place, parts being broken away and other parts seen in section.

Fig. 5 is an edge view of the wedge plate detached, its relative position to the fixed and demountable rims being indicated by the dotted lines showing such rims.

Fig. 6 is a view in longitudinal section through the nut and washer, the washer being indicated in dotted lines in its condition immediately preceding its application to the nut.

Fig. 7 is a plan view of the washer detached.

Fig. 8 is a vertical central section therethrough.

Fig. 9 is a perspective view of a modified form of washer.

Fig. 10 is a perspective view of a nut corresponding in modification to the washer seen in Fig. 9.

Fig. 11 is a fragmentary, detail elevation indicating a slight modification in the flange of the wedge plate.

Referring to the drawings by numerals, 1 indicates the felly of a wheel, such as the carrying wheel of an ordinary automobile, on which is mounted the fixed rim 2 having the usual supporting stop flange 3. The demountable rim 4 rests at its inner edge upon the flange 3 in the usual manner and is supported at its outer edge on the spaced wedges interposed between the demountable rim and fixed rim. Each of said wedges consists of a wedge plate 5 adapted to extend substantially radially alongside the felly portion of the wheel and having an axially inwardly-extending wedging projection 6. The said projection is beak-like in form, having an upper surface formed on a compound curve and an inner or under surface on a straight inclined line. The compound curve provides a comparatively sharp entering edge filled by an enlargement sufficiently abrupt for rapidly taking up the excess space between the demountable rim and fixed rim. The wedge projection then tapers more gently axially outward so as to have a less radially expanding action as it further enters between the two rims, so that the pressure exerted by the wedge which effects a distortion of the rim may be accomplished with greater power and with consequent less speed than the mere adjustment of the rim to place as occurs when the edge of the wedge is entering. Supplementing the incline of the under face of the wedge projection 6 the wedge plate is formed with a fillet 6' at each end of the wedge projection, the fillet 6' being of considerably more abrupt taper than the incline of the under face of the wedge projection 6 so as to cause the wedge to move radially outward at the desired proportional advance as it is shifted axially across the rim 2. The plate 5 is formed with an axially extending bearing lug 7 at its inner end, and the body of plate 5 is formed with a key-hole slot 8. A curved flange 9 outstands from the outer face of the plate 5 beneath the lower end of the slot 6, and partly surrounds the enlarged lower end of said slot. The wedge plate is adapted to be forced into and withdrawn from its operative position by a nut swiveled to the plate and adapted to engage a bolt 10 anchored in the felly 1. The said nut is formed with a polygonal head 11 which, in operation, is disposed beyond the outer face of the plate 5 and has a sleeve 12 extending axially through the slot 8 and provided with a flange 13 at its inner end inwardly beyond the inner face of the plate 5. A washer 14 is interposed between the nut head 11 and the plate 5 and retained in position by the flange 9 which is turned over to overlap the washer 14 as clearly seen in Figs. 1 and 2.

The assemblage of the nut and washer with the plate 5 requires a special construction of the parts, and to this end the flange 13 is formed of segments with intervening spaces, and the washer 14 while formed as a continuous annulus throughout that portion which is of greater diameter than the diameter of flange 13 is also formed of segments 14' adapted to pass through the openings between the segments which constitute the flange 13. The enlarged lower end of the slot 8 is of a diameter slightly larger than the diameter of the flange 13, so that to assemble the parts it is only necessary to bring the segmental projections of annulus 14 into register with the segmental openings in flange 13, and then to move the washer along the sleeve 12 until it strikes the shoulder formed by the head 11. The sleeve is then introduced through the enlarged end of slot 8, the flange 13 passing therethrough. This assemblage occurs while the flange 9 is in the condition indicated in Fig. 3. Immediately thereafter the flange is bent up to overhang the washer as indicated in Figs. 1 and 2, and the operator makes a depression 9' at the lowest point in the flange 9, which depression is above the upper surface of the flange 9 when the flange is in the outstanding portion seen in Fig. 3. Of course, the washer 14 is held in an elevated position while the punched-in projection 9' is being formed. The nut and washer may then be lowered to the position seen in Fig. 1. The washer, however, cannot be lowered to its initial position, that is, the position of assemblage. As a consequence, the nut cannot be lowered to its point of introduction and the flange 13, therefore, cannot assume a position in alinement with the enlarged end of the slot 8. Hence the flange engages the rear face of the plate 5 so as to withdraw the wedge from its operative position when the nut is backed off along the bolt 10.

In Figs. 6, 7 and 8, is illustrated a slightly modified arrangement for enabling the assemblage of the washer with the nut, the same method of connection of the parts with the wedge plate being employed. In this embodiment the nut 11' is provided with a sleeve 12' having the flange 13'. The flange 13' is a continuous annular flange, and the washer 14' is substantially identical with washer 14. When the parts are to be assembled, since the segmental projections on the annulus 14' cannot pass the flange 13 while extending radially inward in their normal position, they are struck laterally to the position indicated in Fig. 8 and in dotted lines in Fig. 6, so that they will pass over the flange 13' and the washer may thus be caused to surround the sleeve 12'. As soon as the washer assumes this position the segmental projections are again straightened out so as to assume the position indicated in full lines in Fig. 6. The operation of the structure and the balance of the assemblage thereof will be the same as that above described.

In Fig. 11, I have shown a slightly modified embodiment in which the wedge plate 5' is provided with fragmentary flanges 9ᵃ in lieu of the continuous flange 9. The other parts are identical with the first above described, and the washer 14 is held in its elevated position by indentations punched at 9" in the flange segments 9ᵃ.

What is claimed is:—

1. A locking wedge member for locking a demountable rim to a wheel body comprising a wedge plate adapted to extend along one face of the wheel body and having a wedging projection extending axially from the plate, the projection tapering on a substantially straight line at its under surface and tapering with a compound curve at its upper surface, the wedging projection and plate being connected at the under side of the terminals of the wedging projection by fillets having inclined edges continuing the incline of the under surface of the wedging projection at a more abrupt angle than the incline of the under surface of the wedging projection.

2. A locking wedge member for locking a demountable rim to a wheel body comprising a plate having a wedging projection, the plate being formed with a slot which is wider at its lower portion than at its upper portion, a nut having a sleeve extending through said slot, a head at one end and a flange at the other end of the sleeve, the slot at its upper portion being of less width than the flange and at its lower portion of greater width than the flange for permitting the flange to pass through the slot when brought into register with the lower portion and preventing passage of the flange through the slot at any other point, and means for sustaining the nut in an elevated position with the sleeve within the slot for preventing the flange from registering with the larger portion of the slot.

3. A locking wedge member for locking a demountable rim to a wheel body comprising a plate having a wedging projection, the plate being formed with a slot which is wider at its lower portion than at its upper portion, a nut having a sleeve extending through said slot, a head at one end and a flange at the other end of the sleeve, the slot at its upper portion being of less width than the flange and at its lower portion of greater width than the flange for permitting the flange to pass through the slot when brought into register with the lower portion and preventing passage of the flange through the slot at any other point, and the projection on the plate designed to be formed subsequent to the introduction of the sleeve through the slot to sustain the nut with the flange out of register with the larger portion of the slot.

4. A locking wedge member for locking a demountable rim to a wheel body comprising a plate having a wedging projection, the plate being formed with a slot which is wider at its lower portion than at its upper portion, a nut having a sleeve extending through said slot, a head at one end and a flange at the other end of the sleeve, the slot at its upper portion being of less width than the flange and at its lower portion of greater width than the flange for permitting the flange to pass through the slot when brought into register with the lower portion and preventing passage of the flange through the slot at any other point, a washer surrounding the sleeve between the head of the nut and the outer face of the plate, and means for sustaining the washer in an elevated position and preventing the sleeve from being lowered to a position of registration of the flange with the larger portion of the slot.

5. The combination of a nut adapted for manipulating a locking wedge member, said nut being formed with a sleeve having a head at one end and an outstanding flange at the other, and a washer surrounding the sleeve and having projections engaging the sleeve.

6. The combination of a nut adapted for manipulating a locking wedge member, said nut being formed with a sleeve having a head at one end and a flange at the other, and a washer surrounding the sleeve and having projections engaging the sleeve, the main body of the washer aside from the projections having an internal diameter greater than the diameter of the flange.

7. The combination of a nut adapted for manipulating a locking wedge member, said nut being formed with a sleeve having a head at one end and a flange at the other, and a washer surrounding the sleeve and having projections engaging the sleeve, the main body of the washer aside from the projections having an internal diameter greater than the diameter of the flange, and the flange being formed with notches proportioned to permit the passage of the projections on the washer.

8. The combination of a nut adapted for manipulating a locking wedge member, said nut being formed with a head at one end and an annular flange at the other, and an annular washer, integral throughout, surrounding the sleeve and having projections engaging the sleeve.

9. The combination of a nut adapted for manipulating a locking wedge member, said nut being formed of a sleeve having a head at one end and an annular flange at the other, and an annular washer integral throughout surrounding the sleeve and of less internal diameter than the diameter of the head but of greater internal diameter than the diameter of the flange, the said washer having projections extending radially inward to the sleeve.

In testimony whereof I affix my signature in presence of two witnesses.

LOUIS H. PERLMAN.

Witnesses:
I. B. LEIBSON,
E. M. FRÜHLING.